Patented Sept. 13, 1949

2,481,769

UNITED STATES PATENT OFFICE 2,481,769

ESTER-LACTONES OF ISOPROPENYL ACETATE HETEROPOLYMERS

Louis M. Minsk and William O. Kenyon, Rochester, N. Y., assignors to Eastman Kodak Company, Rochester, N. Y., a corporation of New Jersey No Drawing. Application November 27, 1945, Serial No. 631,214

8 Claims. (Cl. 260—78.5)

This invention relates to resinous ester-lactones and to a process for preparing the same. More particularly, it relates to ester-lactones which are prepared from the resinous heteropolymers of isopropenyl acetate and certain unsaturated alpha, beta-dicarboxylic acid anhydrides, esters and other derivatives thereof.

It is known that vinyl compounds such as vinyl acetate and styrene are homopolymerizable to high molecular weight resinous compounds, and that they can also be polymerized with unsaturated compounds, for example, maleic anhydride, esters and other derivatives of maleic, fumaric, citraconic and mesaconic acids. In contrast, isopropenyl acetate is neither a vinyl compound nor homopolymerizable to a high molecular weight resin. Furthermore, unlike vinyl acetate and styrene, isopropenyl acetate will not copolymerize to high molecular weight compounds with citraconic acid, its esters or anhydride or with mesaconic acid and esters. However, as disclosed in copending application Serial No. 631,215 (now United States Patent 2,452,165, dated October 26, 1948), in the name of Cornelius C. Unruh and William O. Kenyon, isopropenyl acetate can be heteropolymerized to high molecular weight resins with maleic anhydride, and esters of maleic and fumaric acids.

We have found that by treating such heteropolymeric resins of isopropenyl acetate and maleic anhydride, or isopropenyl acetate and esters of maleic or fumaric acid, with primary alcohols, there are obtained the corresponding ester-lactone resins which constitute the compounds of our invention. The latter are highly suitable for the preparation of molded objects, and in certain species, for the production of coatings and sheet materials possessing good clearness, flexibility and strength. Suitable alcohols include members which are liquids at about room temperature, for example, alcohols having up to 12 carbon atoms in a straight chain, but preferably for higher flexibility, alcohols having from 5 to 12 carbon atoms in the chain.

Our new ester-lactone resins can be prepared by a process comprising treating, for example, the heteropolymer of isopropenyl acetate and maleic anhydride with a monohydric alcohol to remove acyl groups, esterify acid or anhydride groups, and form the lactone derivatives. The reaction is facilitated by the presence of a catalyst such as sulfuric acid or its acid equivalent. Hydrochloric acid can be employed instead of sulfuric acid. The catalyst accelerates not only the lactone formation, but the esterification and deesterification reactions as well. While the reaction is carried out preferably in the absence of water, an aqueous condition can be employed, if a higher carboxyl group content is desired. Because of the inherent difficulties of determination, the structure of our resins has not been completely defined, but one of the possible formulations is as follows:

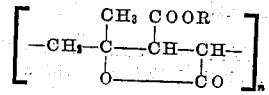

wherein R represents an alcohol radical or group and $n$ indicates repetition of the fundamental group. Our new compounds are in fact resinous esters of monohydric alcohols and the lactones of heteropolymers of isopropenyl alcohol and unsaturated unsubstituted alpha-beta-dicarboxylic acids.

The new ester-lactone resins above defined differ structurally but little from related vinyl acetate-maleic anhydride heteropolymers. However, in their chemical and physical behavior, these differences of the two series of resins are quite significant. For example, in the preparation of our resins more drastic reaction conditions are necessary than with the vinyl acetate-maleic anhydride heteropolymer to obtain the same degree of esterification and lactonization. Thus for the preparation of our butyl-lactone resin, the sulfuric acid had to be increased about five fold for complete reaction, over that required for complete conversion of the corresponding vinyl acetate-maleic anhydride heteropolymer to the ester-lactone. Similarly, isopropenyl acetate-fumaric acid esters reacted slowly, whereas corresponding vinyl acetate-fumaric acid esters lactonized rapidly under similar conditions. Differences exist also in the flexibility of the products of the two series of resins. The alkyl-ester-lactones of the isopropenyl acetate-maleic anhydride heteropolymer give brittle products, when the carbon chain length of the alkyl group is less than five, but flexible products, when the chain length is five or greater. In comparison, the butyl ester-lactone of the vinyl acetate-maleic anhydride heteropolymer is flexible.

These differences in behavior of related series of resins can be partly explained by the branching of the fundamental hydrocarbon chain of the respective resin types. Our new resins are branched in the sense that methyl groups are attached to the fundamental chain at regular intervals, that is, they are part of the isopropenyl radical, whereas the vinyl acetate-maleic anhydride heteropolymer by the same definition is unbranched. In resin chemistry, this type of branching leads to a difference in properties best exemplified by the acrylate and methacrylate resins. As is well known, the former are soft and elastic, easily saponified and reesterified, while the latter are hard and brittle, difficult to saponify, and in the polymeric acid form, also difficult to reesterify. In view of the preceding and the fact that isopropenyl acetate-maleic anhydride heteropolymer yields a flexible ester-lactone, only when an amyl group or greater replaces the butyl group, the conclusion seems warranted that the individual properties of a film base such as flexibility, tensile strength and dimensional stability under stress, moisture and temperature are each a contribution of a specific portion of the resin molecule in relation to other specific portions of the same molecule. Accordingly, our new ester-lactones constitute a series of resins having distinctive chemical and physical characteristics.

It is an object of our invention, therefore, to provide new ester-lactone resins. A further object of the invention is to provide a process for preparing such ester-lactone resins. Other objects will become apparent hereinafter.

The following examples will serve to illustrate our new ester-lactone resins and the manner of their preparation.

EXAMPLE I.—HETEROPOLYMERIZATION OF ISOPROPENYL ACETATE AND MALEIC ANHYDRIDE 58.8 grams (0.6 mole) of maleic anhydride were dissolved in 60 grams (0.6 mole) of isopropenyl acetate and 0.12 gram of benzoyl peroxide were added. The reaction flask was fitted with a reflux condenser and heated with contents on a steam bath with occasional stirring. When the temperature reached the boiling point of the isopropenyl acetate, a vigorous reaction took place and the mixture set to a clear, almost colorless resin. This was cooled and dispersed in acetone. The resulting dope was poured into benzene to precipitate the polymer, and the latter leached with fresh benzene and dried at 60° C. The yield was 75 grams. The specific viscosity of the polymer in acetone was 0.061. Analysis of the product showed 49.7 per cent by weight maleic anhydride compared to 49.5 per cent by weight according to theory. A similar product was obtained by carrying the reaction out in acetone in the presence of hydrogen peroxide catalyst, precipitating the product in benzene and drying at 60° C.

EXAMPLE II.—ETHYL ESTER-LACTONE OF ISOPROPENYL ACETATE-MALEIC ANHYDRIDE HETEROPOLYMER 125 grams (0.63 mole) of isopropenyl acetate-maleic anhydride heteropolymer prepared in the manner of Example I were heated with 1500 cc. (25.5 mole) of absolute ethyl alcohol on a steam bath to a clear solution. To this was added with stirring a solution adjusted to 60° C. and consisting of a mixture of 200 cc. (3.5 mole) of concentrated sulfuric acid and 500 cc. (8.5 mole) of absolute ethyl alcohol. The reaction mixture was heated on a steam bath for a period of 24 hours, which resulted in the product being precipitated in the form of a cake. After cooling and pouring off the excess liquid, the cake was dissolved in one liter of acetone, and then reprecipitated by pouring the dope in a fine stream, with stirring into distilled water. The precipitate was washed free of acid with distilled water and dried at 50° C. The yield of the ester-lactone was 110 grams. The coated film was brittle. The analytical data are given in Table 1.

*Table 1*

| | Found, Percent by Weight | Group | Calculated Percent by Weight Group |
|---|---|---|---|
| Ethoxyl | 18.9 | $-CH-COOC_2H_5$ | 36.1 |
| Acetyl | 4.6 | $\begin{array}{c} CH_3 \\ -CH_2-C-OOCCH_3 \end{array}$ | 10.6 |
| Carboxyl as maleic acid | 8.3 | $-CH-COOH$ | 8.3 |
| Lactone | 41.5 | $\begin{array}{c} CH_3 \\ -C-CH_2-CH- \\ O\hspace{1em}CO \end{array}$ | 41.5 |
| Total | | | 96.5 |

There remains a different of but 3.5 per cent unaccounted for. This may be due to hydroxyl group present in the molecule from units which remained unlactonized after the initial hydrolysis of the acetate radical on the isopropenyl nucleus. However, the analytical data indicates that a compound was obtained which was substantially the ethyl ester-lactone of isopropenyl acetate-maleic anhydride heteropolymer.

EXAMPLE III.—BUTYL ESTER-LACTONE OF ISOPROPENYL ACETATE-MALEIC ANHYDRIDE HETEROPOLYMER 125 grams (0.63 mole) of isopropenyl acetate-maleic anhydride heteropolymer were heated with 1500 cc. (16.2 mole) of normal butyl alcohol and a catalyst of 200 cc. (3.5 mole) of concentrated sulfuric acid in 500 cc. (5.4 mole) of normal butyl alcohol added, following in general the procedure of Example II. The yield of butyl ester-lactone was 118 grams. The specific viscosity was 0.092 and the acidity 0.56 cc. of normal reagent per gram, equivalent to 3.36 per cent of combined maleic acid. Coatings from compositions, cured at 65° C. had a flexibility of 4 folds, a breaking load of 10 kgs. and an elongation of 6 per cent at a thickness of 0.005-inch. When cured at 100° C. the films were brittle.

EXAMPLE IV.—HEXYL ESTER-LACTONE OF ISOPROPENYL ACETATE-MALEIC ANHYDRIDE HETEROPOLYMER 125 grams (0.63 mole) of isopropenyl acetate-maleic anhydride heteropolymer were dissolved in 1500 cc. (12 mole) of normal hexyl alcohol by heating the mixture on a steam bath. To this dope was added with stirring, a solution adjusted to a temperature of 75° C. and consisting of a mixture of 200 cc. (3.5 mole) of concentrated sulfuric acid and 1000 cc. of (8 mole) of normal hexyl alcohol. The reaction mixture was then heated on a steam bath for a period of 24 hours, which resulted in the precipitation of the ester-lactone product in the form of a cake. After cooling and pouring off the excess liquid, the cake was dissolved in acetone and the product reprecipitated in 6 liters of methyl alcohol and extracted several times with fresh portions of methyl alcohol. This treatment removed most of the color from the product. The resinous precipitate was then redissolved in 1200 cc. of acetone and finally precipitated in about 12 liters of distilled water. The fibrous product was obtained in a rather soft condition, but became hardened on longer soaking in distilled water. It was then washed free from acid with distilled water and dried at 50° C. The yield was 112 grams of fibrous ester-lactone product. The specific viscosity in acetone was 0.104. Chemical analysis of the product gave only 0.5 per cent by weight of acetyl group and 3.69 per cent by weight of carboxyl group, calculated as maleic acid, indicating thereby that the product was substantially the hexyl ester-lactone derivative. This product, when dissolved and coated from acetone, gave a clear, strong and flexible film suitable as a film base for photographic layers or other kinds of layers requiring a flexible support. Coatings cured at 65° C. had a flexibility of 36 folds, a breaking load of 8 kilograms, an elongation of 40 per cent and tear of 80 at a thickness of 0.005-inch. When cured at 100° C. the flexibility was 25 folds, breaking load 8 kilograms, and elongation 16 per cent. The product was also moldable, with or without plasticizers into finished shapes by the usual methods for working thermoplastic materials such as extrusion, injection or compression molding, the said solid shapes or masses being workable by heat or mechanical means for rolling, kneading, drawing, cutting, filing, boring, and the like.

EXAMPLE V.—ETHYL ESTER-LACTONE OF ISOPROPENYL ACETATE-DIETHYL FUMARATE HETEROPOLYMER 27.2 (0.1 mole) grams of isopropenyl acetate-diethyl fumarate heteropolymer were heated under reflux on a steam bath with 272 cc. (4.7 mole) of absolute ethyl alcohol. The resin dissolved readily into solution. To this dope there was added a solution warmed to 60° C. and consisting of 56 cc. of distilled water, 50 cc. of ethyl alcohol and 20 cc. (0.4 mole) of concentrated sulfuric acid. A considerable amount of resin precipitated during the addition of the acid solution. When the reaction mixture was heated on the steam bath, this precipitate quickly redissolved. After 18 days of further refluxing, the reaction mixture started to become cloudy, and after 19 days, two layers had formed, the top cloudy, and the lower clear. After 24 days, the lower layer assumed the form of a soft cake, when the mixture was shaken. On cooling, the cake hardened, after which the supernatant liquid was poured off, and the cake dissolved in 300 cc. of acetone. This dispersion was poured in a fine stream, with stirring, into 6 liters of distilled water. The resin was obtained in the form of white fibers. It was washed with distilled water, until free from acid, centrifuged and dried at 50° C. The yield was 22.6 grams. Analysis of this product showed 7.2 per cent by weight acetyl, 28.35 per cent by weight ethoxyl, and a free acidity equivalent to 3.34 per cent of fumaric acid. The starting heteropolymer of isopropenyl acetate-diethyl fumarate showed by analysis, 14.05 per cent by weight acetyl and 35.8 per cent by weight of ethoxyl.

EXAMPLE VI.—AMYL ESTER-LACTONE OF ISOPROPENYL ACETATE-MALEIC ANHYDRIDE HETEROPOLYMER 75 (0.38 mole) grams of isopropenyl acetate-maleic anhydride heteropolymer were heated with 900 cc. (8.4 mole) of technical grade normal amyl alcohol on a steam bath. When the resin was completely dispersed, there was added to the dope a solution adjusted to a temperature of 65° C. and consisting of a mixture of 120 cc. (2.12 mole) of normal amyl alcohol. There resulted a considerable precipitation which redissolved upon further heating on a steam bath. The resin came out of solution in the form of a cake after continued heating on the steam bath for a period of about 21 hours. The excess liquid was decanted off, the cake dissolved in one liter of acetone, and this solution then precipitated into 6 precipitate was extracted and kneaded with fresh liters of 95 per cent ethyl alcohol. The resinous portions of the same alcohol, until a colorless product was obtained. It was then redissolved in 750 cc. of acetone, reprecipitated in 9 liters of distilled water, washed free of acid with fresh portions of distilled water, centrifuged, and dried at 50° C. The yield of the amyl ester-lactone was 50 grams. The specific viscosity in acetone was 0.152. Chemical analysis of the purified resin gave a content of 1.50 per cent by weight of acetyl and 7.2 per cent by weight of carboxyl group, calculated as maleic acid. The resin coated from an acetone dope gave a sheet which was clear, strong and flexible. Coatings cured at 65° C. had a flexibility of sixteen folds, a breaking load of 10 kilograms, and an elongation of 6 per cent at a thickness of 0.005 inch. When cured at 100° C. the flexibility was twelve folds, breaking load 11 kilograms, and elongation 6 per cent.

EXAMPLE VII.—ISOAMYL ESTER-LACTONE OF ISOPROPENYL ACETATE-MALEIC ANHYDRIDE HETEROPOLYMER 125 grams (0.63 mole) of isopropenyl acetate-maleic anhydride heteropolymer were dispersed in 1500 cc. (14 mole) of Eastman grade isoamyl alcohol and heated on a steam bath. When solution was complete, there was added a solution fixed at a temperature of 70° C. and consisting of 200 cc. (3.5 mole) of concentrated sulfuric acid and 500 cc. of chilled isoamyl alcohol. After heating the reaction for 24 hours on the steam bath, the resin was obtained in the form of a cake. This was purified in similar manner to the hexyl ester-lactone described in Example IV. The product was a white fiber having a specific viscosity of 0.154, an acetyl of 0.85 per cent by weight and carboxyl of 4.53 per cent by weight calculated as maleic acid. The sheet cast from this material and cured at 65° C. had a flexibility of 1 fold, a breaking load of 10.2 kilograms, and an elongation of 6 per cent. When cured at 100° C. the film was brittle.

EXAMPLE VIII.—ISOPROPYL ESTER-LACTONE OF ISOPROPENYL ACETATE-MALEIC ANHYDRIDE HETEROPOLYMER 100 grams (0.51 mole) of isopropenyl acetate-maleic anhydride heteropolymer were refluxed in an all-glass apparatus with 1200 cc. (16 mole) of isopropyl alcohol. When dispersion was complete, there was added a solution warmed to 60° C. and consisting of 160 cc. (2.9 mole) of concentrated sulfuric acid and 400 cc. of isopropyl alcohol. After heating this reaction mixture on the steam bath for 24 hours, the supernatant liquid was poured off the resinous cake which had formed, the cake was dissolved in one liter of acetone, and reprecipitated in 12 liters of distilled water, washed with distilled water and centrifuged. The precipitate was dissolved once more in acetone and reprecipitated in distilled water, washed acid-free with fresh portions of distilled water, centrifuged and dried at 50° C. The yield was 67 grams. Analysis showed an acetyl content of 1.7 per cent by weight, an isopropyl content of 22.7 per cent by weight, and a free acidity equivalent to 13.9 per cent calculated as maleic acid. The films coated from this product were brittle.

EXAMPLE IX.—CYCLOHEXYL ESTER-LACTONE OF ISOPROPENYL ACETATE-MALEIC ANHYDRIDE HETEROPOLYMER 19.8 grams (0.1 mole) of isopropenyl acetate-maleic anhydride heteropolymer were dispersed in 238 cc. (2.0 mole) of cyclohexanol on a steam bath. A solution of 32 cc. (0.54 mole) of concentrated sulfuric acid and 80 cc. of cyclohexanol was added. After 23 hours heating on the steam bath, the resin precipitated in the form of a brown cake. The supernatant liquid was poured off, the cake dissolved in 300 cc. acetone and reprecipitated in three liters of absolute ethyl alcohol. The precipitate was extracted with two 500 cc. portions of fresh absolute ethyl alcohol and redissolved in acetone. The acetone dispersion was then pored in a fine stream into three liters of distilled water, with stirring, and the resin obtained as a white fiber. This was washed acid-free with distilled water, centrifuged and dried at 50° C. The yield of product was 18 grams. Analysis showed that the resin contained 0.55 per cent by weight of acetyl and a free acidity equivalent to 9.98 per cent by weight of maleic acid.

While our new ester-lactone resins are suitable for molding purposes, only those members having an ester group with a straight chain of at least five carbon atoms, illustrated in our examples with amyl- and hexyl ester-lactones, produce flexible coatings and sheets without the use of plasticizing agents. It will be understood, however, that the more brittle members will also become flexible by addition of plasticizers. Laminating properties are best with the softer members which give sheets suitable for making safety glasses. The hardness of our resins as related to the length of the carbon chain of the ester group is illustrated in the following Table II, wherein are shown tests on similarly prepared compression molded buttons.

Table II

|  | Brinell Hardness No. | Scratch Hardness |
|---|---|---|
| Ethyl ester—Lactone Resin | 12.2 | 73 |
| Butyl ester—Lactone Resin | 9.8 | 60 |
| Hexyl ester—Lactone Resin | 6.1 | 41 |

The resinous products of our examples and products closely related thereto can be extruded in the form of wires, rods, tubes and sheets, or molded by the usual compression or injection processes. Fillers, coloring materials and plasticizers can be added. In the usual practice, the resin is first softened with a softening agent, fillers added if desired, and then kneaded, rolled, compressed or drawn under normal or heated conditions. Our new resins can also be transformed into useful films and sheets by making a solution of the resin in a solvent, and then casting the solution on a film-forming surface such as a glass or metal plate or a smooth revolving drum, allowing the cast to dry, and stripping the film from the surface. Solutions of our resins can also be extruded in the form of fine thread into a drying atmosphere or a precipitating bath.

As indicated, our new resins are susceptible of modifications by the addition of certain plasticizers of which the following are typical:

Benzyl phthalate
Benzyl succinate
Butoxyethyl tetrahydrofuroate
Butyl phthalate
Camphor
Cyclohexyl acetate
Diethylene glycol monobutyl ether
Diethylene glycol dibutyrate
Ethoxyethyl adipate
Ethoxyethyl sebacate
Ethyl phthalate
Ethylene glycol monobenzyl ether
Methoxyethyl phthalate
Tetrahydrofurfuryl adipate
Triacetin
Tripropionin
Triamyl phosphate
Tributyl phosphate
Triethylene glycol diacetate
Triphenyl phosphate
Tribromo phenol Other modifying agents such as non-drying oils, drying oils, semi-drying oils, natural resins, synthetic resins, waxes, cellulose derivatives such as cellulose acetate, cellulose acetatepropionate, cellulose acetate-butyrate, ethyl cellulose, and similar kind of cellulose derivatives, and pigments, fillers, dyes, can be admixed with our ester-lactone resins.

What we claim is:

1. A process for preparing a resinous ester comprising heating to reacting temperature one molecular proportion of the equimolar heteropolymer of isopropenyl acetate and maleic anhydride with from 2 to 25 molecular proportions of normal hexyl alcohol, in the presence of sulphuric acid, whereby hexyl ester-lactone formation occurs.

2. A process for preparing a resinous ester comprising heating to reacting temperature one molecular proportion of the equimolar heteropolymer of isopropenyl acetate and maleic anhydride with from 2 to 25 molecular proportions of normal amyl alcohol, in the presence of sulfuric acid, whereby amyl ester-lactone formation occurs.

3. A process for preparing a resinous ester comprising heating to reacting temperature one molecular proportion of an equimolar heteropolymer of isopropenyl acetate and a compound selected from the group consisting of maleic anhydride, a dialkyl maleate wherein each alkyl group is saturated and contains from 1 to 4 carbon atoms, and a dialkyl fumarate wherein each alkyl group is saturated and contains from 1 to 4 carbon atoms, with from 2 to 25 molecular proportions of a saturated monohydric aliphatic alcohol containing from 1 to 12 carbon atoms, in the presence of an acid selected from the group consisting of sulphuric acid and hydrochloric acid, whereby ester-lactone formation occurs.

4. A process for preparing a resinous ester comprising heating to reacting temperature one molecular proportion of the equimolar heteropolymer of isopropenyl acetate and maleic anhydride, with from 2 to 25 molecular proportions of a saturated monohydric aliphatic alcohol containing from 1 to 12 carbon atoms, in the presence of sulphuric acid, whereby ester-lactone formation occurs.

5. A process for preparing a resinous ester comprising heating to reacting temperature one molecular proportion of the equimolar heteropolymer of isopropenyl acetate and maleic anhydride, with from 2 to 25 molecular proportions of a saturated primary monohydric aliphatic alcohol containing from 5 to 12 carbon atoms, in the presence of sulphuric acid, whereby ester-lactone formation occurs.

6. A process for preparing a resinous ester comprising heating to reacting temperature one molecular proportion of the equimolar heteropolymer of isopropenyl acetate and a dialkyl fumarate wherein each alkyl group is saturated and contains from 1 to 4 carbon atoms, with from 2 to 25 molecular proportions of a saturated monohydric aliphatic alcohol containing from 1 to 12 carbon atoms, in the presence of sulphuric acid, whereby ester-lactone formation occurs.

7. A process for preparing a resinous ester comprising heating to reacting temperature one molecular proportion of the equimolar heteropolymer of isopropenyl acetate and diethyl fumarate, with from 2 to 25 molecular proportions of ethyl alcohol, in the presence of sulphuric acid, whereby ester-lactone formation occurs.

8. The resinous ester obtained by the process of claim 3.

LOUIS M. MINSK.
WILLIAM O. KENYON.

REFERENCES CITED

The following references are of record in the file of this patent:

UNITED STATES PATENTS

| Number | Name | Date |
| --- | --- | --- |
| 2,306,072 | McNally et al. | Dec. 22, 1942 |
| 2,396,785 | Hanford | Mar. 19, 1946 |